United States Patent
Wu

(10) Patent No.: US 10,299,173 B2
(45) Date of Patent: May 21, 2019

(54) DEVICE AND METHOD OF HANDLING A PDN CONNECTION IN LTE TO NR/5G INTER-SYSTEM MOBILITY

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 14 days.

(21) Appl. No.: 15/861,693

(22) Filed: Jan. 4, 2018

(65) Prior Publication Data

US 2018/0192333 A1    Jul. 5, 2018

Related U.S. Application Data

(60) Provisional application No. 62/442,928, filed on Jan. 5, 2017.

(51) Int. Cl.
*H04W 36/00* (2009.01)
*H04W 36/14* (2009.01)
(Continued)

(52) U.S. Cl.
CPC .... *H04W 36/0033* (2013.01); *H04W 36/0011* (2013.01); *H04W 36/14* (2013.01);
(Continued)

(58) Field of Classification Search
CPC . H04W 36/0011; H04W 36/14; H04W 36/22; H04W 36/0033; H04W 88/10;
(Continued)

(56) References Cited

U.S. PATENT DOCUMENTS

2011/0085498 A1* 4/2011 Oba .............. H04W 48/18
370/328
2015/0382281 A1* 12/2015 Sirotkin ........... H04W 52/0251
455/552.1
(Continued)

FOREIGN PATENT DOCUMENTS

| EP | 2 052 564 B1 | | 10/2014 |
|---|---|---|---|
| EP | 3419339 | * | 12/2018 |
| TW | 201811101 | * | 3/2018 |
| WO | 2015/160329 A1 | | 10/2015 |

OTHER PUBLICATIONS

3GPP TR 23.799 V14.0.0, Dec. 2016.
(Continued)

*Primary Examiner* — Afsar M Qureshi
(74) *Attorney, Agent, or Firm* — Winston Hsu

(57) ABSTRACT

A long-term evolution (LTE) network for handling mobility from the LTE network to a new radio (NR)/fifth generation (5G) network comprises a storage device for storing instructions and a processing circuit coupled to the storage device. The processing circuit is configured to execute the instructions stored in the storage device. The instructions comprise activating a Packet Data Network (PDN) connection with a communication device; communicating a Protocol Data Unit (PDU) Session identity/identifier (ID) for the PDN connection with the communication device; communicating data via an evolved packet system (EPS) bearer associated to the PDN connection with the communication device; receiving a context request for the communication device from the NR/5G network; and transmitting a context response comprising a context of the communication device to the NR/5G network in response to the context request.

18 Claims, 10 Drawing Sheets

(51) Int. Cl.
*H04W 36/22* (2009.01)
*H04W 88/06* (2009.01)
*H04W 88/10* (2009.01)

(52) U.S. Cl.
CPC ........... *H04W 36/22* (2013.01); *H04W 88/10* (2013.01); *H04W 88/06* (2013.01)

(58) Field of Classification Search
CPC . H04W 88/06; H04W 72/1215; H04W 76/15; H04W 16/14; H04W 36/002; H04W 36/0066; H04L 29/08009
See application file for complete search history.

(56) References Cited

U.S. PATENT DOCUMENTS

| | | | | |
|---|---|---|---|---|
| 2017/0171782 | A1* | 6/2017 | Mohamed | H04W 36/0011 |
| 2017/0181052 | A1* | 6/2017 | Zhang | H04W 36/08 |
| 2017/0195930 | A1* | 7/2017 | Tomici | H04W 8/06 |
| 2018/0288670 | A1* | 10/2018 | Li | H04W 8/186 |
| 2018/0376446 | A1* | 12/2018 | Youn | H04W 8/20 |

OTHER PUBLICATIONS

Search Report dated May 9, 2018 for EP application No. 18150472.1, pp. 1-6.

3GPP TR 23.799 V14.0.0 (Dec. 2016), "3rd Generation Partnership Project; Technical Specification Group Services and System Aspects; Study on Architecture for Next Generation System (Release 14)", XP051295448, pp. 1-522.

Huawei, Hisilicon, "Comparison of the options for session ID allocation and routing of subsequent SM signalling", SA WG2 Meeting #118, S2-167000, Nov. 14-18, 2016, Reno, Nevada, USA, XP051185441, pp. 1-8.

ZTE, "TS 23.502 P-CR to handover from EPS to NGS", SA WG2 Meeting #120, S2-172154, Mar. 27-31, 2017, Busan, Korea, XP051257712, pp. 1-4.

Nokia et al., "Updates on interworking and migration solution 18.2: Call flows" , SA WG2 Meeting #117; S2-166101, Oct. 17, 2016, Kaohsiung, Taiwan.

Office action dated Aug. 28, 2018 for the Taiwan application No. 107100479, filing date Jan. 5, 2018, p. 1-10.

* cited by examiner

DEVICE AND METHOD OF HANDLING A PDN CONNECTION IN LTE TO NR/5G INTER-SYSTEM MOBILITY

CROSS REFERENCE TO RELATED APPLICATIONS

This application claims the benefit of U.S. Provisional Application No. 62/442,928, filed on Jan. 5, 2017, which is incorporated herein by reference.

BACKGROUND OF THE INVENTION

1. Field of the Invention

The present invention relates to a device and a method used in a wireless communication system, and more particularly, to a device and a method of handling a PDN connection in LTE to NR inter-system mobility in a wireless communication system.

2. Description of the Prior Art

3rd Generation Partnership Project (3GPP) recently starts developing a next generation cellular system called a new radio (NR) system or a fifth generation (5G) system. Inter-system mobility between the long-term evolution (LTE) system and the NR/5G system is an issue to be solved.

SUMMARY OF THE INVENTION

The present invention therefore provides a communication device and method for handling data transmissions in a wireless communication system to solve the abovementioned problem.

A long-term evolution (LTE) network for handling mobility from the LTE network to a new radio (NR)/fifth generation (5G) network comprises a storage device for storing instructions and a processing circuit coupled to the storage device. The processing circuit is configured to execute the instructions stored in the storage device. The instructions comprise activating a Packet Data Network (PDN) connection with a communication device; communicating a Protocol Data Unit (PDU) Session identity/identifier (ID) for the PDN connection with the communication device; communicating data via an evolved packet system (EPS) bearer associated to the PDN connection with the communication device; receiving a context request for the communication device from the NR/5G network; and transmitting a context response comprising a context of the communication device to the NR/5G network in response to the context request.

A LTE network for handling mobility from the LTE network to a NR/5G network comprises a storage device for storing instructions and a processing circuit coupled to the storage device. The processing circuit is configured to execute the instructions stored in the storage device. The instructions comprise activating a PDN connection with a communication device; communicating a PDU Session ID for the PDN connection with the communication device; communicating data via an EPS bearer associated to the PDN connection with the UE; transmitting a request message to the NR/5G network, to initiate a handover for the communication device to the NR/5G network, wherein the request message comprises a context of the communication device; receiving a response message from the NR/5G network, wherein the response message comprises a handover command message for handing over the communication device to the NR/5G network; and transmitting the handover command message to the communication device.

A communication device for handling mobility from a LTE network to a NR/5G network comprises a storage device for storing instructions and a processing circuit coupled to the storage device. The processing circuit is configured to execute the instructions stored in the storage device. The instructions comprise activating a first PDN connection with the LTE network; communicating a first PDU Session ID for the first PDN connection with the LTE network; communicating first data via an EPS bearer associated to the first PDN connection with the LTE network; receiving a handover command message from the LTE network, wherein the handover command message configures a first radio bearer (RB) which is associated to the first PDU Session ID; handing over from the LTE network to the NR/5G network according to the handover command message; and communicating second data of a first data flow on the first RB with the NR/5G network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
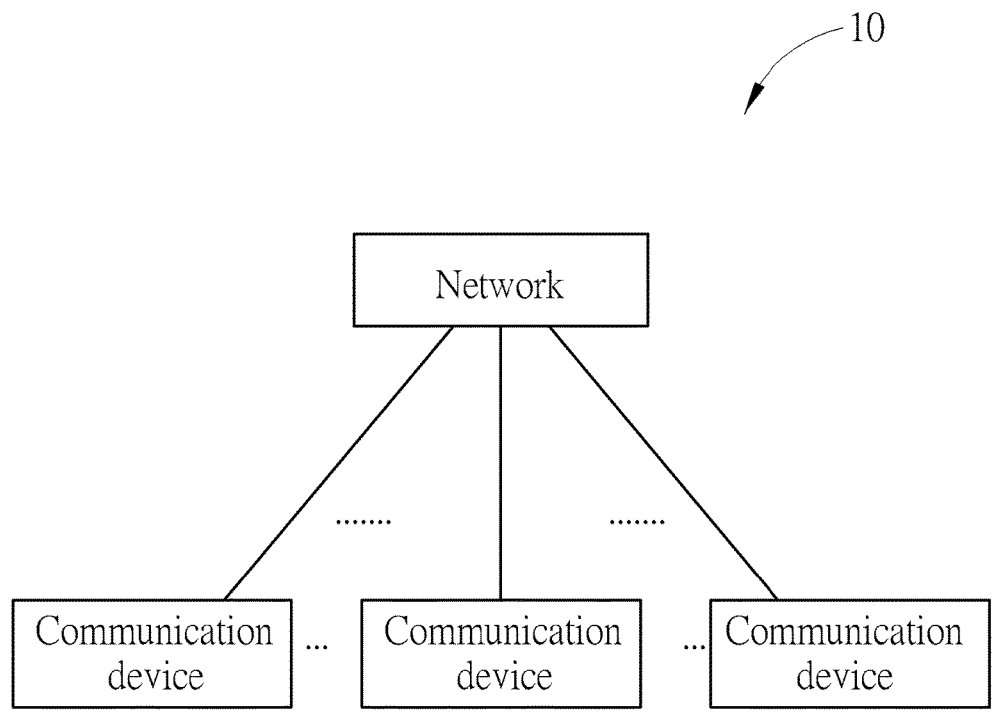
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may communicate with each other via one or multiple cells belonging to one or multiple base stations (BSs).

The network may comprise an evolved universal terrestrial radio access network (E-UTRAN) including at least one evolved Node-B (eNB) or a new radio (NR)/fifth generation (5G) network including at least one NR/5G BS (e.g., gNB).

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
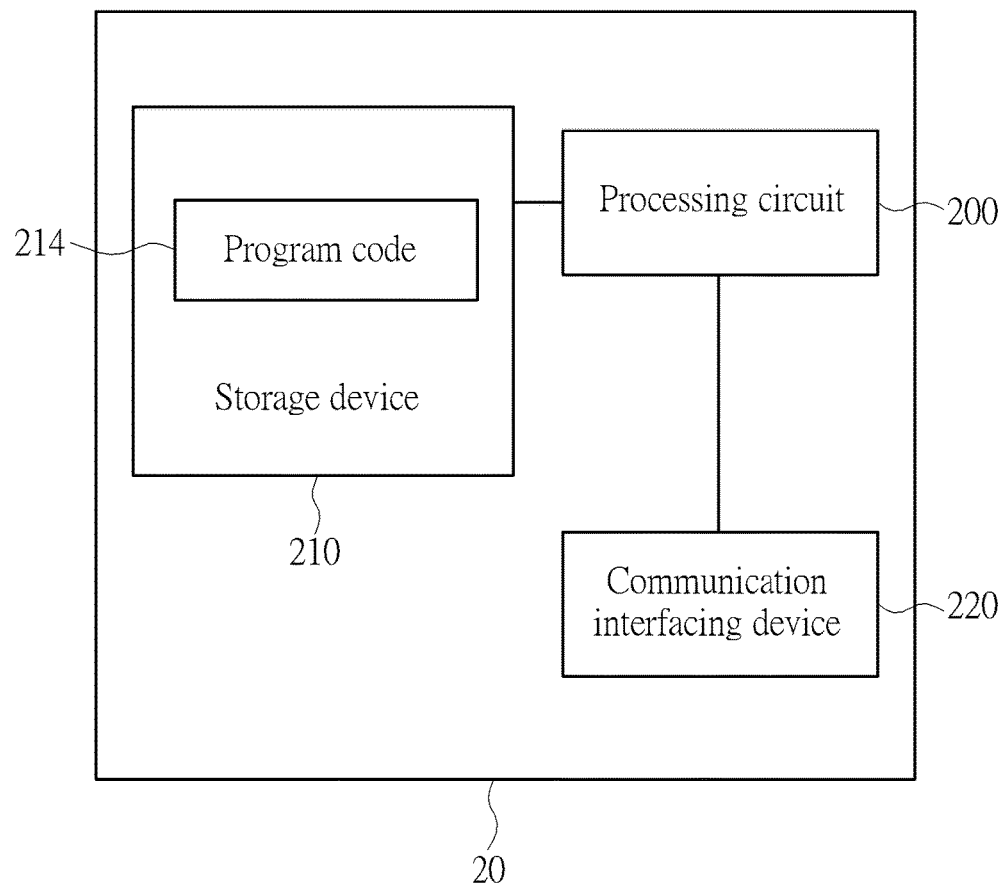
FIG. 2 is a schematic diagram of a communication device according to an example of the present invention.

FIG. 2 is a schematic diagram of a communication device 20 according to an example of the present invention. The communication device 20 may be a communication device or the network in FIG. 1, but is not limited herein. The communication device 20 may include a processing circuit 200 such as a microprocessor or Application Specific Integrated Circuit, a storage device 210 and a communication interfacing device 220. The storage device 210 may be any data storage device that may store a program code 214, accessed and executed by the processing circuit 200. Examples of the storage device 210 include but are not limited to a subscriber identity module, read-only memory, flash memory, random-access memory, hard disk, optical data storage device, non-volatile storage device, non-transitory computer-readable medium (e.g., tangible media), etc. The communication interfacing device 220 includes at least one transceiver and is used to transmit and receive signals (e.g., data, messages and/or packets) according to processing results of the processing circuit 200.

In the following examples, a UE is used to represent a communication device in FIG. 1, to simplify the illustration of the embodiments.

Figure 3:
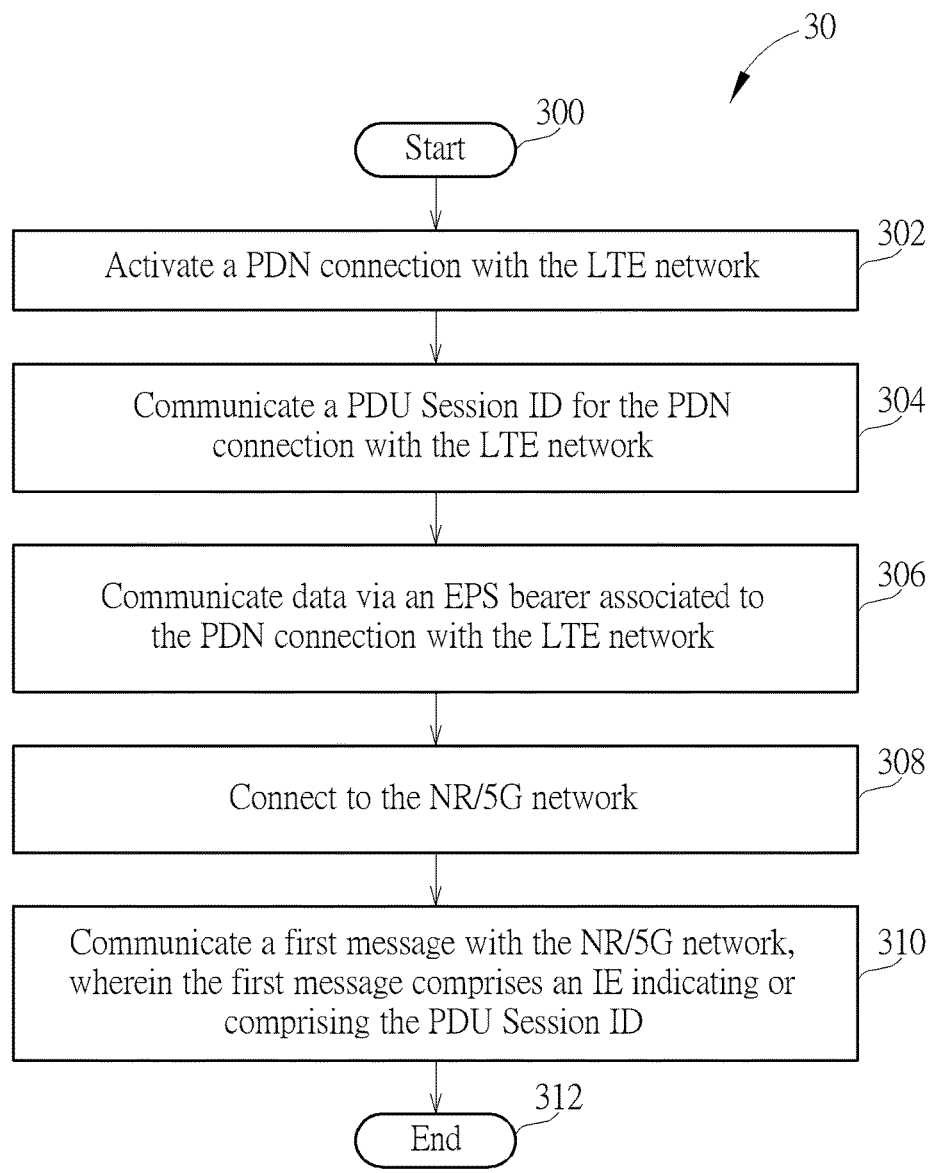
FIG. 3 is a flowchart of a process according to an example of the present invention.

FIG. 3 is a flowchart of a process 30 according to an example of the present invention. The process 30 is utilized in a UE in FIG. 1, to handle mobility from a long-term evolution (LTE) network to a new radio (NR)/fifth generation (5G) network. The process 30 includes the following steps:

Step 300: Start.

Step 302: Activate a Packet Data Network (PDN) connection with the LTE network.

Step 304: Communicate a Protocol Data Unit (PDU) Session identity/identifier (ID) for the PDN connection with the LTE network.

Step 306: Communicate data via an evolved packet system (EPS) bearer associated to the PDN connection with the LTE network.

Step 308: Connect to the NR/5G network.

Step 310: Communicate a first message with the NR/5G network, wherein the first message comprises an information element (IE) indicating or comprising the PDU Session ID.

Step 312: End.

The following examples may be applied to the process 30.

In one example, the LTE network configures the EPS bearer associated to the PDN connection, to the UE. The UE communicates (e.g., transmits or receives) the PDU Session ID for the PDN connection with (e.g., to or from) the LTE network. The UE communicates the data via the EPS bearer with the LTE network (e.g., a first BS of the LTE network). Then, the UE connects to the NR/5G network according to a handover or a cell selection/reselection. In case of the handover, the UE receives a handover command message from the first BS. The handover command message configures the UE to hand over to a cell of the NR/5G network, and the UE connects to the cell (e.g., of a second BS). The UE performs the handover to the cell of the NR/5G network in response to the handover command message received from the LTE network. The UE transmits a handover complete message to the NR/5G network.

In one example, the first message is an NR/5G message which is a radio resource control (RRC) message or a Non Access Stratum (NAS) message. In one example, the NAS message is a mobility management (MM) or a session management (SM) message. In one example, the MM message is a service request message, a tracking area update (TAU) request message or a registration request message. In one example, the IE indicates a PDU Session context status. When the NR/5G network receives the PDU Session ID in the MM message, the NR/5G network maintains or keeps a PDU Session context identified by the PDU Session ID for the UE. The NR/5G network may receive the PDU Session context for the UE from the LTE network. Alternatively, the NR/5G network receives an EPS bearer context and generates (e.g., derives, converts to or maps to) the PDU Session context according to the EPS bearer context. In one example, the NR/5G network receives the PDU Session ID from the LTE network. In one example, the NR/5G network determines the PDU Session ID, e.g., according to the activating order of the PDN connection. The LTE network may indicate the activating order of the PDN connection to the NR/5G network.

In one example, the SM message is an activate dedicated quality of service (QoS) flow context request, a PDU session resource allocation request, a PDU session resource modification request, a QoS flow resource allocation request, a QoS flow resource modification request, a deactivate QoS flow context request, a deactivate QoS flow context accept, a modify QoS flow context request, a modify QoS flow context reject, a modify QoS flow context accept, a Deactivate PDU Session Request, a Deactivate PDU Session Accept, a SM information request or a SM information response. When receiving the PDU Session ID in the SM message, the UE or the NR/5G network operates the PDU Session context identified by the PDU Session ID according to a purpose of the SM message. For example, the UE or the NR/5G network transmits the Deactivate PDU Session Request to the NR/5G network or the UE, to request a release of a PDU Session identified by the PDU Session ID. The NR/5G network or the UE transmits the Deactivate PDU Session Accept in response to the Deactivate PDU Session Request.

Figure 4:
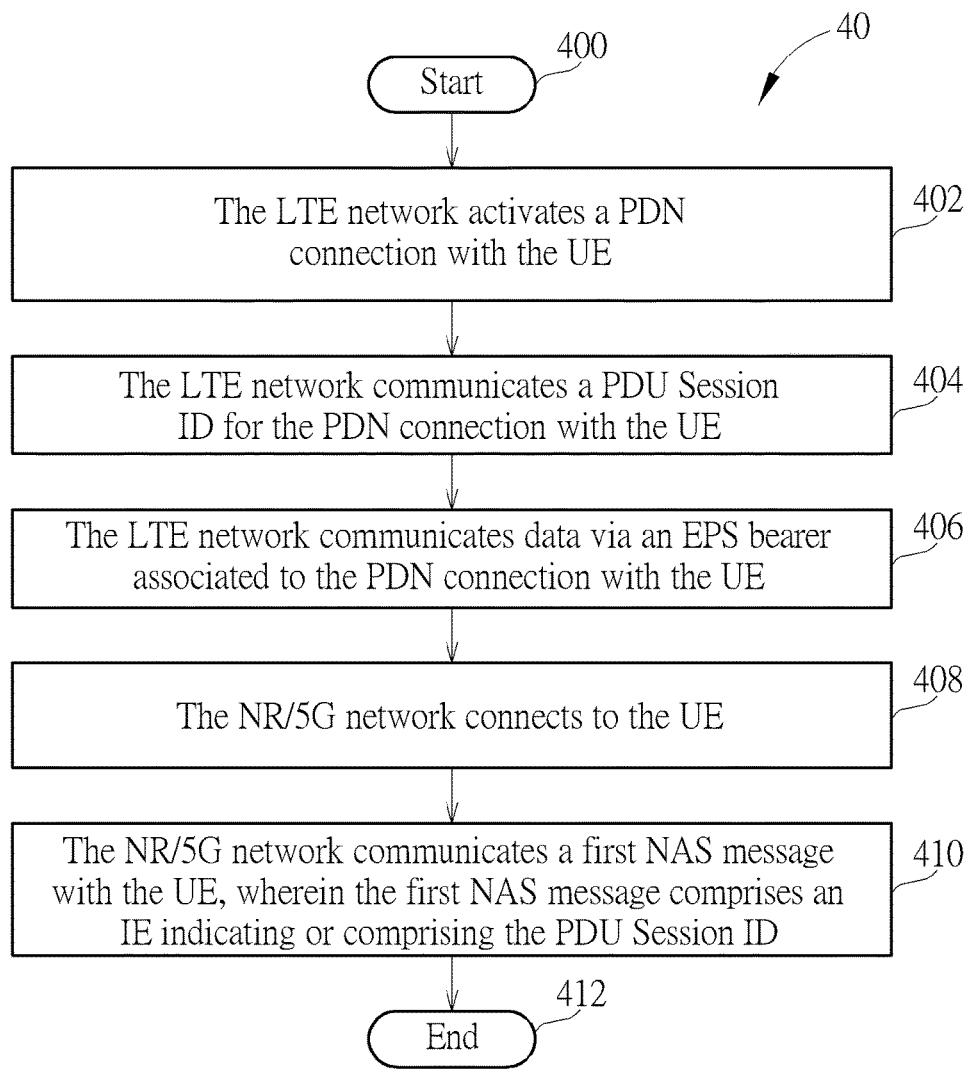
FIG. 4 is a flowchart of a process according to an example of the present invention.

FIG. 4 is a flowchart of a process 40 according to an example of the present invention. The process 40 is utilized in a network including a NR/5G network and a LTE network, in FIG. 1, to handle mobility from the LTE network to the NR/5G network. The process 40 includes the following steps:

Step 400: Start.

Step 402: The LTE network activates a PDN connection with a UE.

Step 404: The LTE network communicates a PDU Session ID for the PDN connection with the UE.

Step 406: The LTE network communicates data via an EPS bearer associated to the PDN connection with the UE.

Step 408: The NR/5G network connects to the UE.

Step 410: The NR/5G network communicates a first message with the UE, wherein the first message comprises an IE indicating or comprising the PDU Session ID.

Step 412: End.

The following examples may be applied to the process 40.

In one example, when receiving the first message transmitted by the NR/5G network (or the UE), the UE (or the NR/5G network) processes a PDU Session identified by the PDU Session ID according to a purpose of the first message.

Operations in the process 40 may correspond to those in the process 30.

Figure 5:
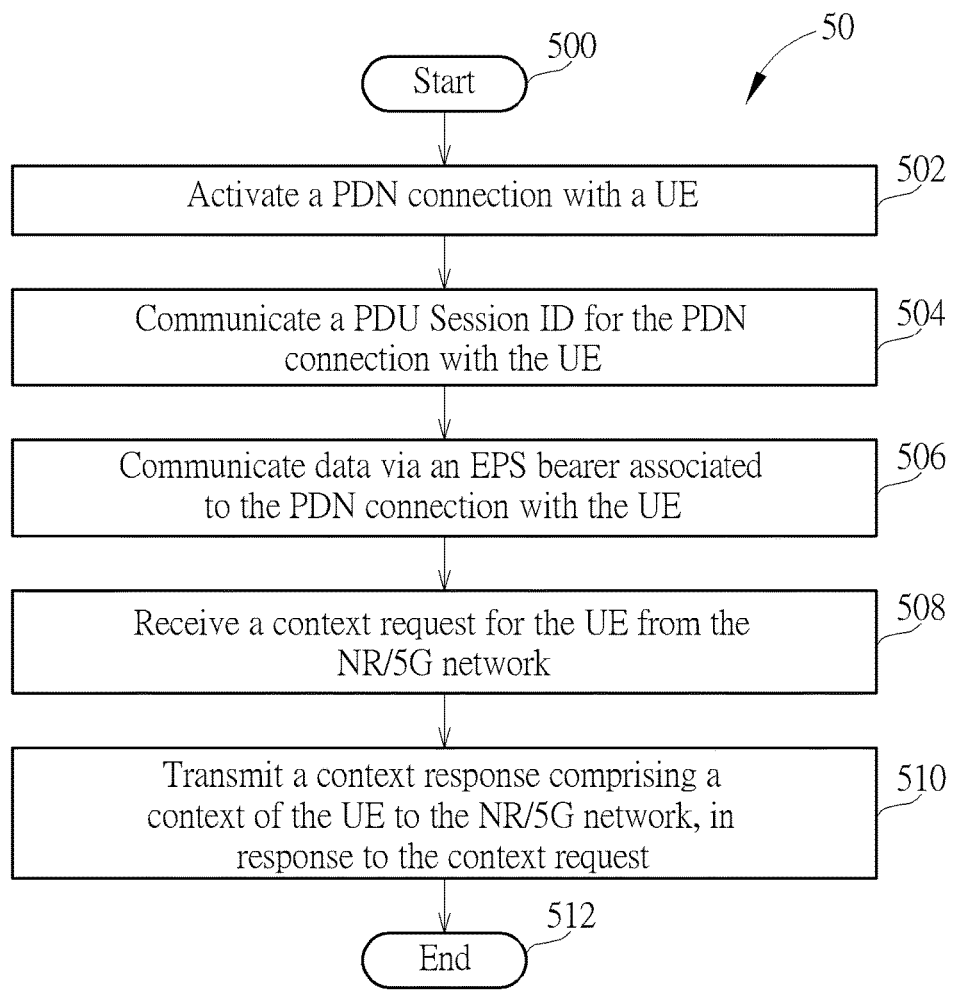
FIG. 5 is a flowchart of a process according to an example of the present invention.

FIG. 5 is a flowchart of a process 50 according to an example of the present invention. The process 50 is utilized in a LTE network, to handle mobility from the LTE network to a NR/5G network. The process 50 includes the following steps:

Step 500: Start.
Step 502: Activate a PDN connection with a UE.
Step 504: Communicate a PDU Session ID for the PDN connection with the UE.
Step 506: Communicate data via an EPS bearer associated to the PDN connection with the UE.
Step 508: Receive a context request for the UE from the NR/5G network.
Step 510: Transmit a context response comprising a context of the UE to the NR/5G network, in response to the context request.
Step 512: End.

According to the process 50, the LTE network knows that the UE connects to the NR/5G network and releases the context in response to the context request or after transmitting the context to the NR/5G network.

The following examples may be applied to the process 50.

In one example, the NR/5G network transmits the context request to the LTE network, when receiving a NR/5G request message updating location of the UE (e.g., a TAU request message or a registration request message) from the UE. The NR/5G network transmits a NR/5G response message (e.g., a TAU accept message or a registration accept message) to the UE in response to the NR/5G request message, after receiving the context response. In one example, the context includes an EPS context or a NR/5G context.

In one example, the context includes the EPS bearer context. The NR/5G network converts to (e.g., generates, derives or maps to) a PDU Session context from the EPS bearer context, when receiving the EPS bearer context in the context response from the LTE network. The NR/5G network configures a plurality of radio resources to the UE according to the PDU Session context, when receiving a service request message from the UE. The NR/5G network communicates data associated to the PDU Session ID via the plurality of radio resources with the UE. In one example, the context includes the PDU Session context. The LTE network converts to the PDU Session context from the EPS bearer context and transmits the context response comprising the PDU Session context to the NR/5G network in response to the context request.

In one example, the EPS bearer context includes an EPS bearer identity identifying the EPS bearer, an Internet Protocol (IP) address and/or a plurality of Quality of Service (QoS) parameters. The LTE network or the NR/5G network generates a plurality of QoS parameters in the PDU Session context according to the plurality of QoS parameters in the EPS bearer context. The PDU Session context includes the IP address and/or the EPS bearer identity.

In one example, the LTE network activates the PDN connection with the UE and communicates the PDU Session ID for the PDN connection with the UE, as described in the process 30, before receiving the context request. In one example, the context response, the EPS bearer context or the PDU Session context includes the PDU Session ID. In one example, the EPS bearer context is associated to the PDN connection. In one example, the LTE network communicates data via the EPS bearer associated to the PDN connection with the UE, before receiving the context request.

In one example, the plurality of radio resources include at least one of a physical layer configuration, a Media Access Control (MAC) layer configuration and a radio bearer (RB) configuration. In one example, the RB configuration includes at least one of a Radio Link Control (RLC) configuration, a logical channel identity and a logical channel priority for the RB. In one example, the RB configuration includes a RB identity associated to the PDU Session ID. Thus, the NR/5G network communicates the data associated to the PDU Session ID via a RB configured by the RB configuration, with the UE. In one example, the context response or the context includes a temporary UE identity and/or a security configuration (e.g., a security key, a security algorithm, etc.).

Figure 6:
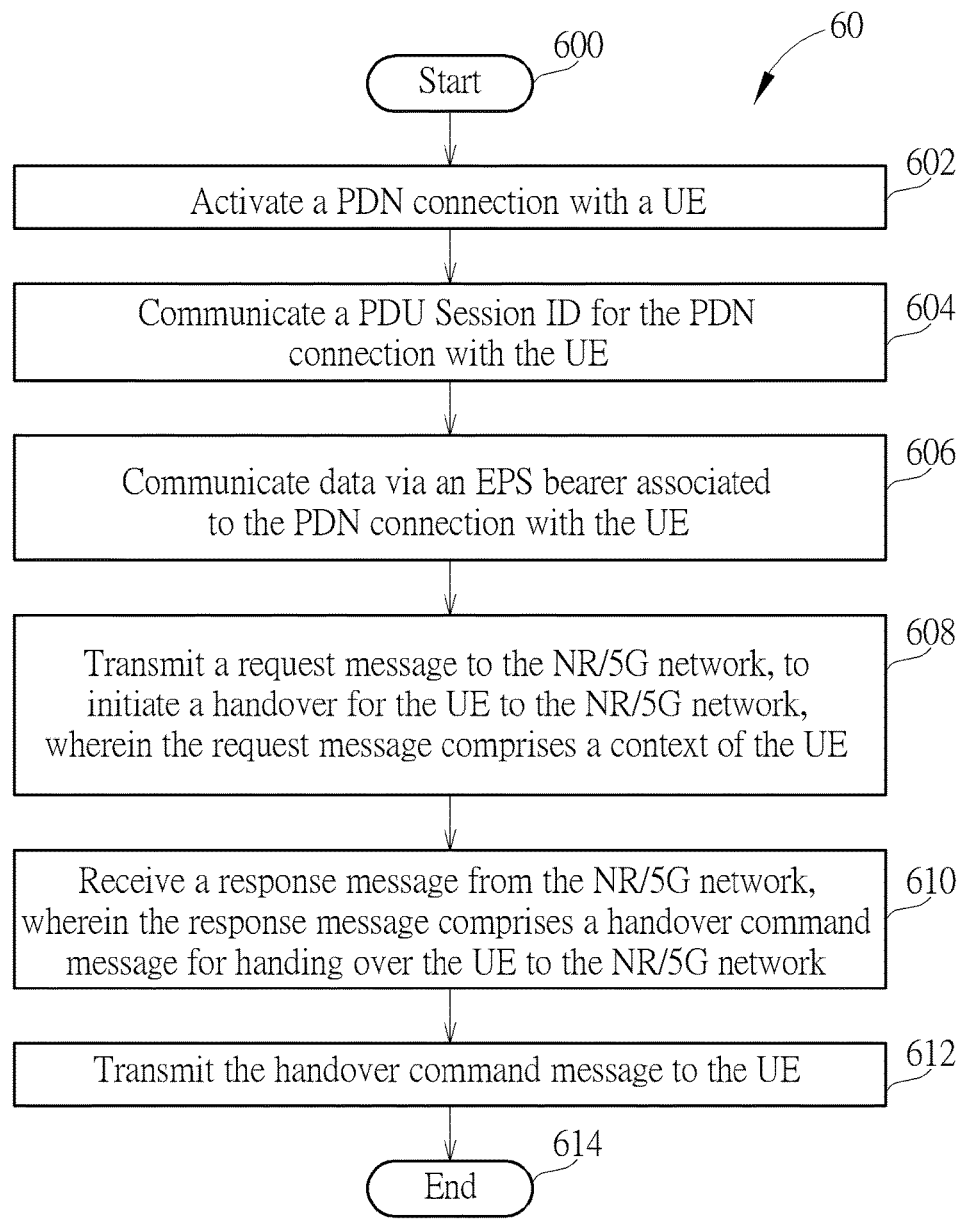
FIG. 6 is a flowchart of a process according to an example of the present invention.

FIG. 6 is a flowchart of a process 60 according to an example of the present invention. The process 60 is utilized in a LTE network, to handle mobility from the LTE network to a NR/5G network. The process 60 includes the following steps:

Step 600: Start.
Step 602: Activate a PDN connection with a UE.
Step 604: Communicate a PDU Session ID for the PDN connection with the UE.
Step 606: Communicate data via an EPS bearer associated to the PDN connection with the UE.
Step 608: Transmit a request message to the NR/5G network, to initiate a handover for the UE to the NR/5G network, wherein the request message comprises a context of the UE.
Step 610: Receive a response message from the NR/5G network, wherein the response message comprises a handover command message for handing over the UE to the NR/5G network.
Step 612: Transmit the handover command message to the UE.
Step 614: End.

The examples of the process 50 may be applied to the process 60, and are not narrated herein. For example, the context includes an EPS bearer context or a PDU Session context. The following examples may be applied to the process 60.

In one example, the request message is a handover request message, and the response message is a handover request acknowledge message.

In one example, the NR/5G network generates the handover command message in response to the request message. Thus, the NR/5G network configures a RB associated to the PDU Session ID to the UE according to the PDU Session context, or schedules a data transmission to the UE according to the PDU Session context. The UE and the NR/5G network communicate (e.g., transmit or receive) data via the RB with (e.g., to or from) each other. The handover command message configures a plurality of radio resources to the UE.

In one example, the plurality of radio resources may include at least one of a physical layer configuration, a MAC layer configuration and a RB configuration. In one example, the RB configuration configures the RB and includes at least one of a packet data convergence protocol (PDCP) configuration, a Radio Link Control (RLC) configuration, a logical channel identity and a logical channel priority. In one example, the RB configuration includes a RB identity identifying the RB and associated to the PDU Session ID.

In one example, the UE performs the handover to the NR/5G network in response to the handover command message received from the LTE network. The UE transmits a handover complete message to the NR/5G network, when successfully connecting to the NR/5G network. The NR/5G network transmits a notification message to the LTE network in response to a reception of the handover complete message. Thus, the LTE network knows that the UE has successfully performed the handover to the NR/5G network and releases at least one context (e.g., the context and/or an UE access stratum context) of the UE, when receiving the notification message. In one example, the request message or the context includes a temporary UE identity and/or a security configuration (e.g., a security key, a security algorithm, etc.).

Figure 7:
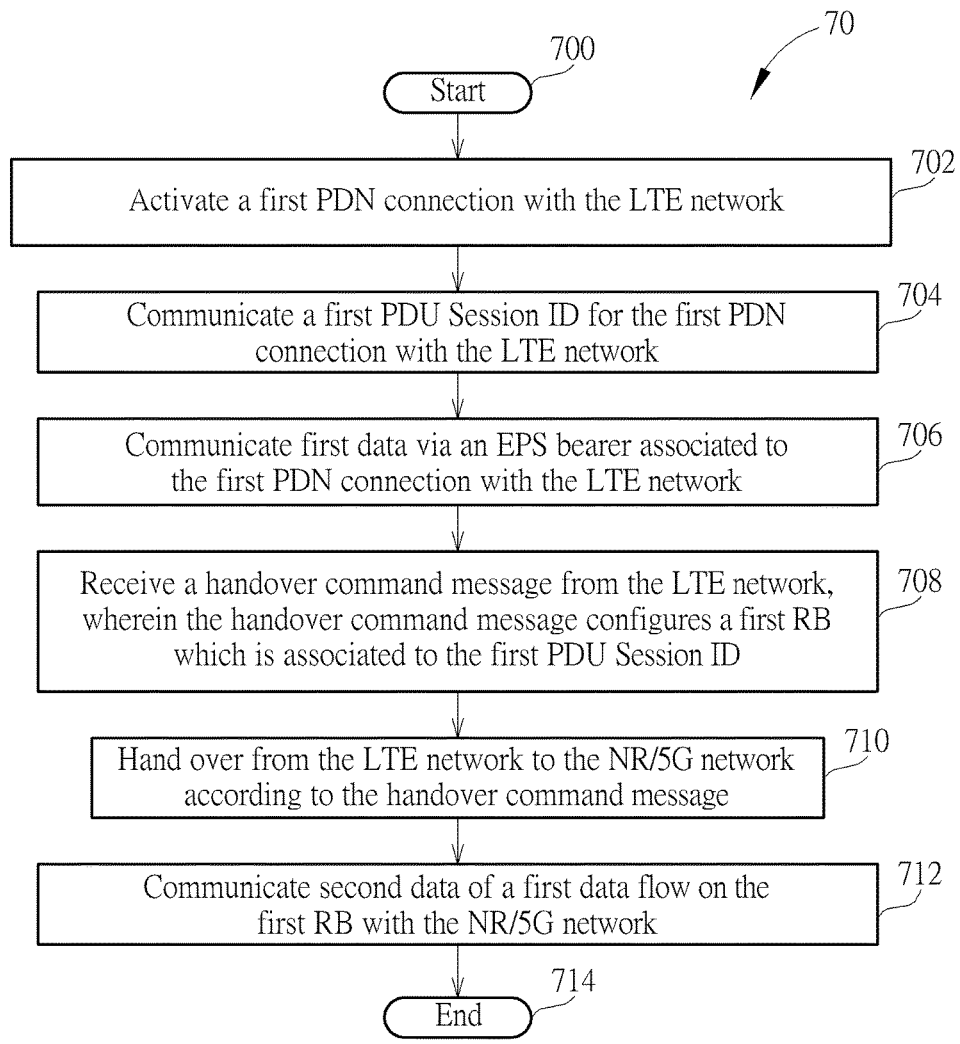
FIG. 7 is a flowchart of a process according to an example of the present invention.

FIG. 7 is a flowchart of a process 70 according to an example of the present invention. The process 70 is utilized in a UE in FIG. 1, to handle mobility from a LTE network to a NR/5G network. The process 70 includes the following steps:

Step 700: Start.

Step 702: Activate a first PDN connection with the LTE network.

Step 704: Communicate a first PDU Session ID for the first PDN connection with the LTE network.

Step 706: Communicate first data via an EPS bearer associated to the first PDN connection with the LTE network.

Step 708: Receive a handover command message from the LTE network, wherein the handover command message configures a first RB which is associated to the first PDU Session ID.

Step 710: Hand over from the LTE network to the NR/5G network according to the handover command message.

Step 712: Communicate second data of a first data flow on the first RB with the NR/5G network.

Step 714: End.

The following examples may be applied to the process 70.

In one example, the first data flow includes an IP flow or a QoS flow. In one example, the first data flow includes a plurality of IP packets which have the same source IP address and/or the same destination IP address. In one example, the first data flow includes a plurality of IP packets which have the same QoS setting or similar QoS settings. The first data may belong to the first data flow.

In one example, the UE communicates (e.g., transmits or receives) the second data of the first data flow on the first RB with (e.g., to or from) the NR/5G network. In one example, the handover command message includes a first RB configuration configuring the first RB, and includes the first PDU Session ID. When the handover command message configures the first RB which is associated to the first PDU Session ID, the UE transmits or receives data of the first data flow on the first RB. In one example, the handover command message includes a flow ID for the first data flow associated to the first PDU Session ID, and associates the flow ID with the first RB.

In one example, the handover command message configures a second RB which is not associated to the first PDU Session ID. In one example, the second RB is a signaling RB. In one example, the handover command message configures the second RB which is associated to a second PDU Session ID associated to a second PDN connection activated by the UE with the LTE network. In one example, the UE communicates third data of a second data flow on the second RB with the NR/5G network. The second data flow includes a QoS flow, an IP flow or a non-IP flow. In one example, the second data flow has a different source IP address or a different destination IP address from that of the first data flow. In one example, the second data flow has the same source IP addresses or the same destination IP addresses from that of the first data flow, but has a different source port number or a different destination port number from that of the first data flow. In one example, the second data flow includes a plurality of IP packets which have the same QoS setting or similar QoS settings. In one example, the handover command message includes a flow ID for the second data flow associated to the second PDU Session ID, and associates the flow ID with the second RB.

Figure 8:
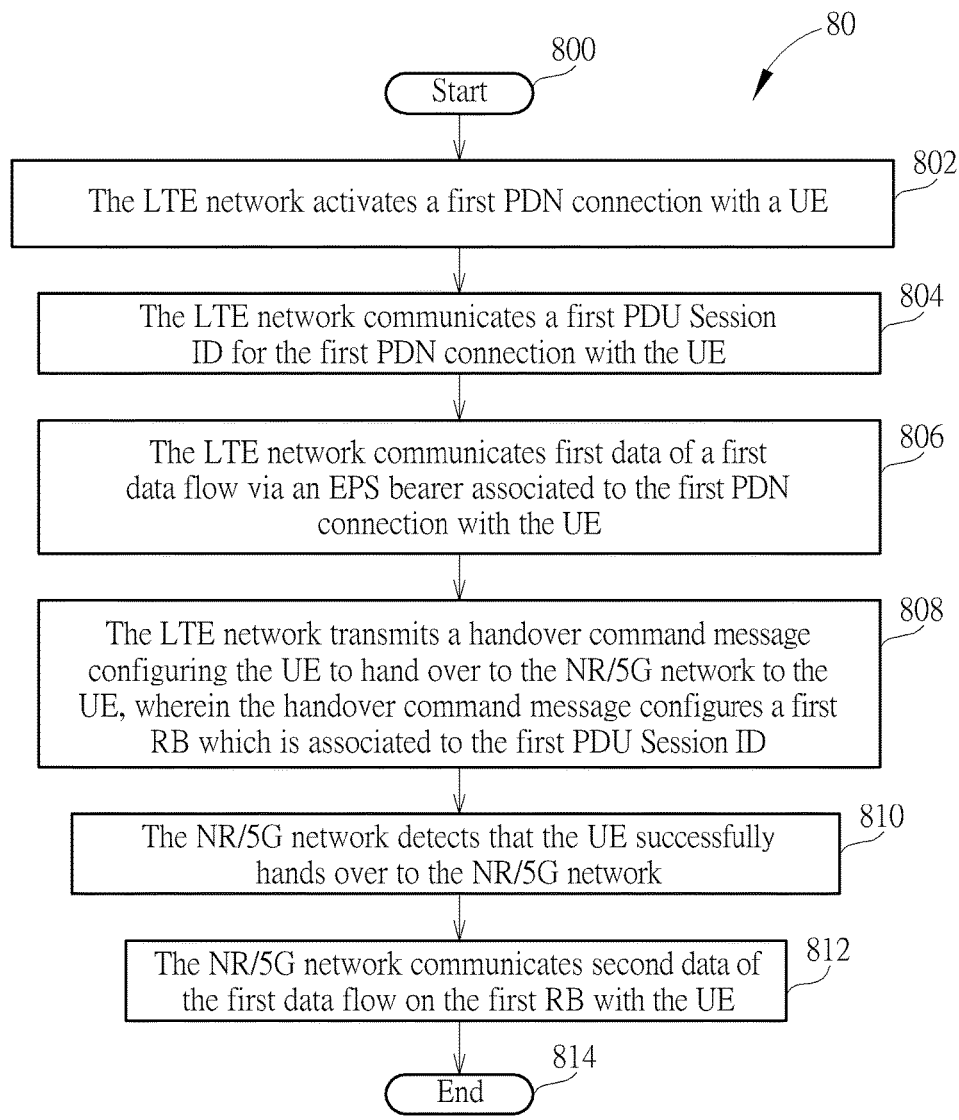
FIG. 8 is a flowchart of a process according to an example of the present invention.

FIG. 8 is a flowchart of a process 80 according to an example of the present invention. The process 80 is utilized in a network including a NR/5G network and a LTE network, in FIG. 1, to handle mobility from the LTE network to the NR/5G network. The process 80 includes the following steps:

Step 800: Start.

Step 802: The LTE network activates a first PDN connection with a UE.

Step 804: The LTE network communicates a first PDU Session ID for the first PDN connection with the UE.

Step 806: The LTE network communicates first data of a first data flow via an EPS bearer associated to the first PDN connection with the UE.

Step 808: The LTE network transmits a handover command message configuring the UE to hand over to the NR/5G network to the UE, wherein the handover command message configures a first RB which is associated to the first PDU Session ID.

Step 810: The NR/5G network detects that the UE successfully hands over to the NR/5G network.

Step 812: The NR/5G network communicates second data of the first data flow on the first RB with the UE.

Step 814: End.

The following examples may be applied to the process 80.

Operations in the process 80 may correspond to operations in the process 70.

Figure 9:
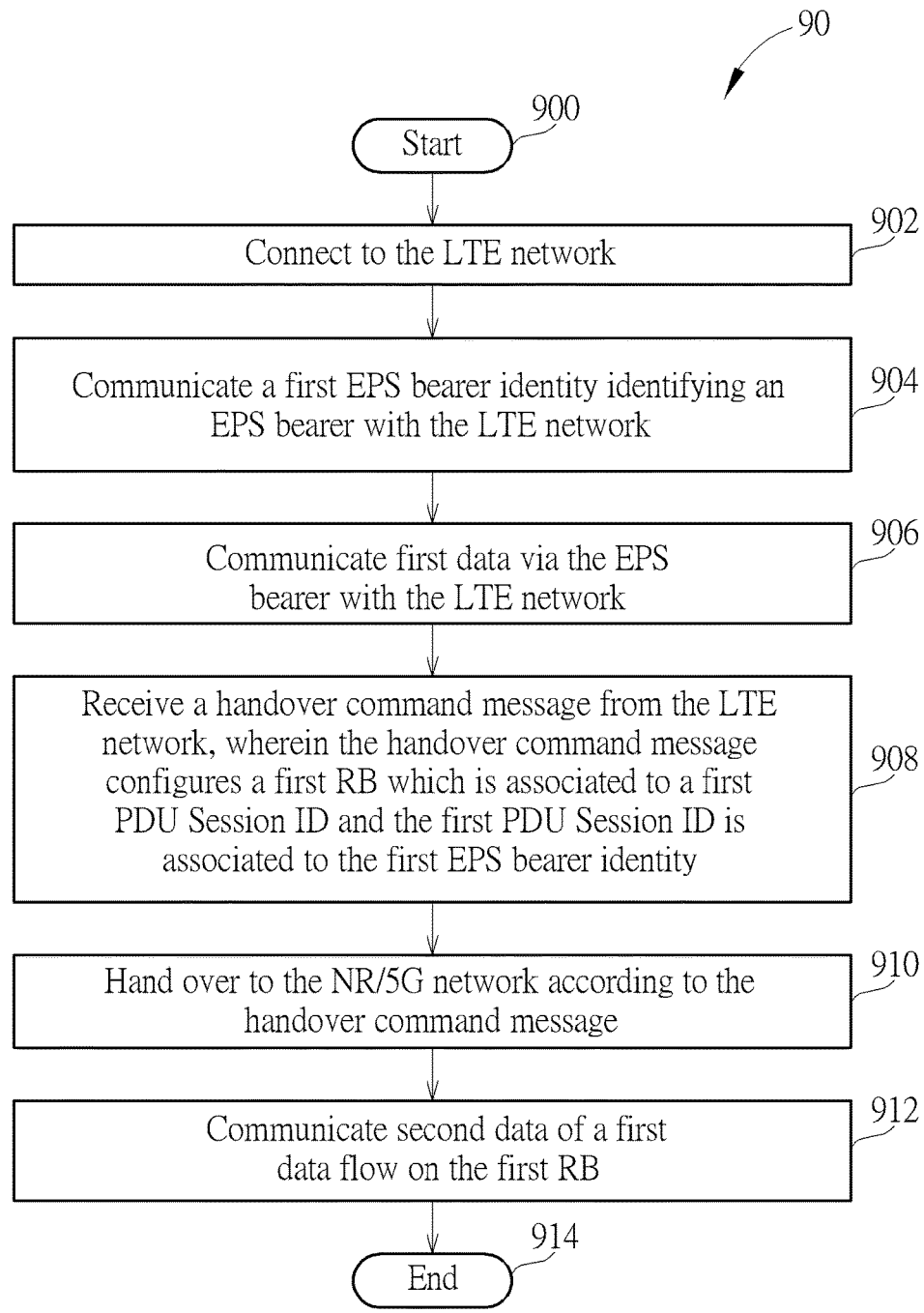
FIG. 9 is a flowchart of a process according to an example of the present invention.

FIG. 9 is a flowchart of a process 90 according to an example of the present invention. The process 90 is utilized in a UE in FIG. 1, to handle mobility from a LTE network to a NR/5G network. The process 90 includes the following steps:

Step 900: Start.

Step 902: Connect to the LTE network.

Step 904: Communicate a first EPS bearer identity identifying an EPS bearer with the LTE network.

Step 906: Communicate first data via the EPS bearer with the LTE network.

Step 908: Receive a handover command message from the LTE network, wherein the handover command message configures a first RB which is associated to a first PDU Session ID and the first PDU Session ID is associated to the first EPS bearer identity.

Step 910: Hand over to the NR/5G network according to the handover command message.

Step 912: Communicate second data of a first data flow on the first RB.

Step 914: End.

In one example, the NR/5G network communicates (e.g., transmits or receives) the second data of the first data flow on the first RB with (e.g., to or from) the UE. The following examples may be applied to the process 90.

In one example, the handover command message includes a first RB configuration configuring the first RB, and includes the first PDU Session ID or a flow ID which is the same as the first EPS bearer identity.

In one example, when determining that the first PDU Session ID is mapped to the first EPS bearer identity or that the first EPS bearer identity is mapped to the first PDU Session ID, the UE transmits the second data of the first data flow on the first RB.

In one example, the handover command message configures a second RB which is associated to a second PDU Session ID set to a second EPS bearer identity. In one example, the UE communicates third data of a second data flow on the second RB with the NR/5G network.

The examples of the process 70 may be applied to the process 90, and are not narrated herein.

Figure 10:
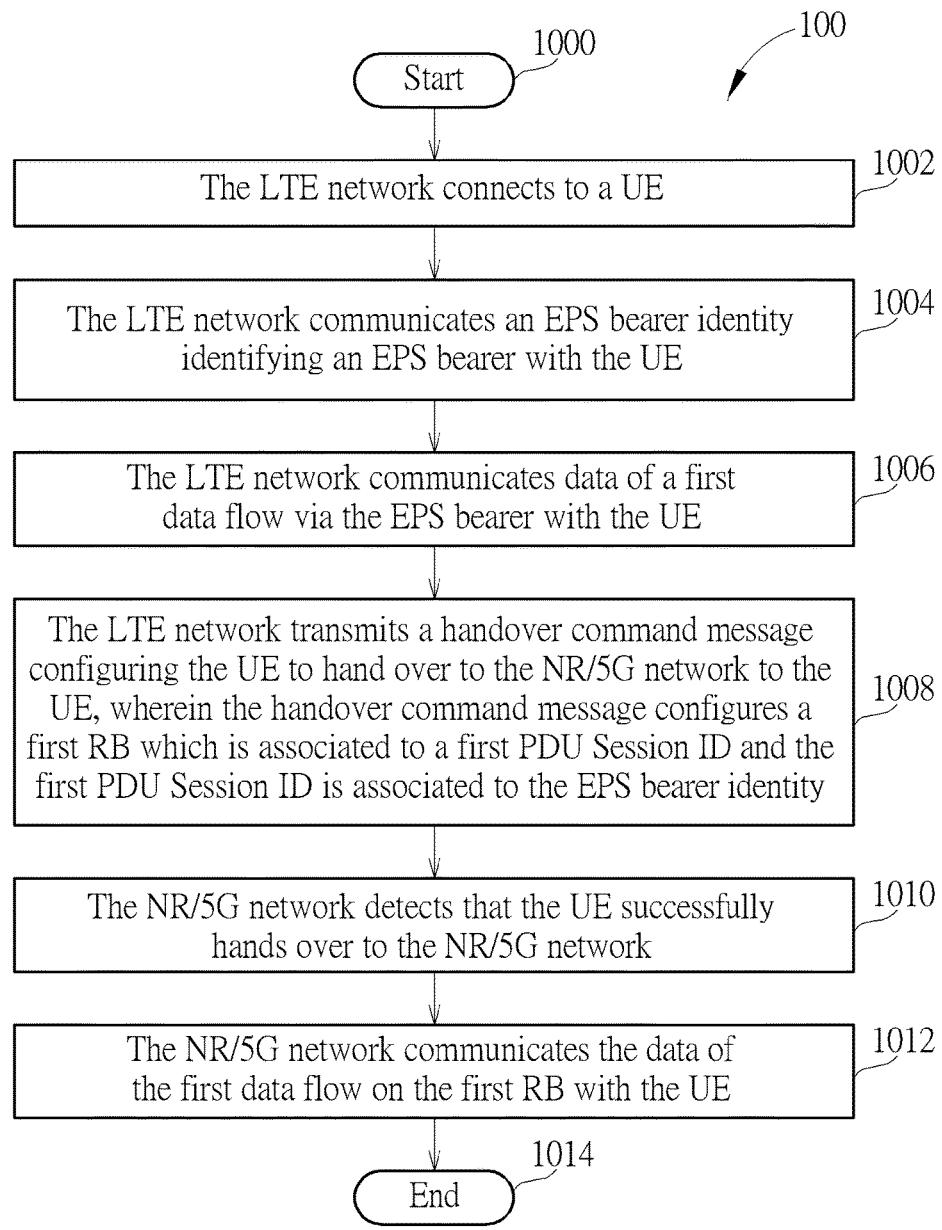
FIG. 10 is a flowchart of a process according to an example of the present invention.

FIG. 10 is a flowchart of a process 100 according to an example of the present invention. The process 100 is utilized in a network including a NR/5G network and a LTE network, in FIG. 1, to handle mobility from the LTE network to the NR/5G network. The process 100 includes the following steps:

Step 1000: Start.

Step 1002: The LTE network connects to a UE.

Step 1004: The LTE network communicates an EPS bearer identity identifying an EPS bearer with the UE.

Step 1006: The LTE network communicates data of a first data flow via the EPS bearer with the UE.

Step 1008: The LTE network transmits a handover command message configuring the UE to hand over to the NR/5G network to the UE, wherein the handover command message configures a first RB which is associated to a first PDU Session ID and the first PDU Session ID is associated to the EPS bearer identity.

Step 1010: The NR/5G network detects that the UE successfully hands over to the NR/5G network.

Step 1012: The NR/5G network communicates the data of the first data flow on the first RB with the UE.

Step 1014: End.

The following examples may be applied to the process 100.

Operations in the process 100 may correspond to operations in the process 90. The examples of the process 90 may be applied to the process 100, and are not narrated herein.

Realization of the processes 30-100 is not limited to the above description. The following examples may be applied to the processes 30-100 or consist of an independent invention.

In one example, the handover command message and the handover complete message are RRC messages. For example, the handover command message is a RRC Reconfiguration message, and the handover complete message is a RRC Reconfiguration Complete message.

In one example, the UE (or the LTE network) allocates (e.g., sets or determines) the PDU Session ID and communicates the PDU Session ID with the LTE network (or the UE) in a LTE RRC procedure or a LTE NAS procedure. In one example, the UE allocates the PDU Session ID, and transmits the PDU Session ID to the LTE network in a UE initiated EPS SM (ESM) procedure. In one example, the LTE network allocates the PDU Session ID, and transmits the PDU Session ID to the UE in a Network initiated ESM procedure. In one example, the UE communicates the PDU Session ID for (or associated to) the PDN connection with the LTE network, during activating (or establishing) the PDN connection with the LTE network. In one example, the UE communicates the PDU Session ID for the PDN connection with the LTE network, after activating the PDN connection with the LTE network.

In one example, the UE communicates the PDU Session ID for the PDN connection in a second message with the LTE network. The second message may be a LTE message. The second message may be a RRC message or a NAS message. For example, the second message is a PDN Connectivity Request or an ACTIVATE DEFAULT EPS BEARER CONTEXT ACCEPT transmitted by the UE to the LTE network. The second message is an ACTIVATE DEFAULT EPS BEARER CONTEXT REQUEST transmitted by the LTE network to the UE. The second message is an ESM INFORMATION RESPONSE message transmitted by the UE to the LTE network or a NOTIFICATION message transmitted by the LTE network to the UE.

In one example, the UE or the LTE network allocates the PDU Session ID, according to an activating order of the first PDN connection.

In one example, the UE or the LTE network allocates a first PDU Session ID (e.g., 0 or 1) associated to the first PDN connection. The UE (or the LTE network) includes the first PDU Session ID in a first LTE message transmitted to the LTE network (or the UE). In one example, the UE or the LTE network allocates a second PDU Session ID (e.g., 1 or 2) associated to a second PDN connection. The UE (or the LTE network) includes the second PDU Session ID in a second LTE message transmitted to the LTE network (or the UE). When the UE connects to the NR/5G network, the UE (or the NR/5G network) uses the first PDU Session ID, e.g., in a first NR/5G message transmitted to the NR/5G network (or the UE). The first NR/5G message may be a RRC message or a NAS message. When the UE connects to the NR/5G network, the UE (or the NR/5G network) uses the second PDU Session ID in a second NR/5G message transmitted to the NR/5G network (or the UE). The second NR/5G message may be a RRC message or a NAS message.

In one example, the UE (or the LTE network) does not communicate the PDU Session ID with the LTE network (or the UE). Thus, steps 304, 404, 604, 704 and 804 are skipped/omitted. In one example, the PDU Session ID is set to an EPS bearer identity associated to the PDN connection, the EPS bearer or the EPS bearer context. In one example, the PDU Session ID is derived according to the EPS bearer identity.

In one example, the UE, the LTE network or the NR/5G network derives (e.g., determines, maps to, generates, or coverts to) the PDU Session ID according to the EPS bearer identity by a math operation. For example, the PDU Session ID is equal to the EPS bearer identity minus N, wherein N is a fixed value. For example, the PDU Session ID is equal to the EPS bearer identity plus N, wherein N is a fixed value. For example, the PDU Session ID is equal to the EPS bearer identity mod N. N may be configured by the NR/5G network, or may be predetermined/described in a standard specification.

In one example that the PDU Session ID is set by the UE, the LTE network or the NR/5G network to the EPS bearer identity, the IE includes the EPS bearer identity. In one example that the PDU Session ID is set by the UE to the EPS bearer identity, the IE indicating the PDU Session ID includes a bit and a position of the bit.

In one example, the UE, the LTE network or the NR/5G network determines the PDU Session ID as "0" (i.e., a starting value), when the PDN connection is the first PDN connection activated in the LTE network. In one example, the UE or the LTE network activates two PDN connections (e.g., PDN connection 1 and PDN connection 2) with the LTE network or the UE. The UE or the LTE network activates the PDN connection 1 first and activates the PDN connection 2 later. Then, the UE, the LTE network or the NR/5G network determines a first PDU Session ID (i.e., the starting value) as "0" according to the PDN connection 1 and a second PDU Session ID (i.e., a value next to the starting value) as "1" according to the PDN connection 2. If a starting PDU Session ID is "1", the UE, the LTE network or the NR/5G network determines the first PDU Session ID as "1" and the second PDU Session ID as "2". It should be noted that the examples above are for illustration. A concept of the present invention is that the PDN connection is mapped to the PDU Session and that the PDU Session ID is associated to the PDN connection. The UE and the network (i.e., the LTE network or the NR/5G network) determine (or use) the same PDU Session ID for the PDU Session. The UE and the network associate (e.g., assign or allocate) the PDN Session ID to the PDN connection.

In one example, the IE includes the PDU Session ID. In one example, the IE indicating the PDU Session ID includes a bit and a position of the bit.

In one example, the UE maps to (e.g., generates, derives or converts to) a PDU Session context from at least one EPS bearer context associated to the PDN connection to communicate with the NR/5G network. The LTE network maps to (e.g., generates, derives or converts to) the PDU Session context from the at least one EPS bearer context associated to the PDN connection, and transmits the PDU Session context to the NR/5G network. Alternatively, the NR/5G network maps to (e.g., generates, derives or converts to) the PDU Session context from the at least one EPS bearer context associated to the PDN connection, and transmits the PDU Session context to the LTE network. The LTE network transmits the at least one EPS bearer context associated to the PDN connection to the NR/5G network.

In one example, when the UE connects to the NR/5G network, the NR/5G network transmits a NR/5G RRC message which configures the flow ID and a RB configuration, to the UE. The RB configuration configures a RB. The UE communicates data of the data flow on the RB. The data flow may be a QoS flow. In one example, the data flow is associated to the PDU Session ID.

In one example, an association between the flow ID and the EPS bearer identity is predetermined, e.g., described in a standard specification.

In one example, the UE transmits the flow ID in a NR/5G message to the NR/5G network. The NR/5G message may be a RRC message, a SM message or a MM message. The NR/5G network includes the flow ID in a first RRC Reconfiguration message transmitted to the UE. Thus, the UE knows that the NR/5G network configures a plurality of radio resources for communicating data of the data flow according to the flow ID, when receiving the first RRC Reconfiguration message. The NR/5G network includes the flow ID in a NG2 Request message. In one example, the plurality of radio resources can be referred to the previous description, and is not narrated herein.

In one example, after establishing the PDU Session, the UE requests to setup other data flow (e.g., QoS flow) to transmit data of the other data flow by transmitting a first NR/5G SM message to the NR/5G network. The first NR/5G SM message includes other flow ID for identifying the other data flow. In one example, the first NR/5G SM message is a QoS Flow Resource Allocation Request message. The NR/5G network transmits a second NR/5G SM message (e.g., an Activate QoS Flow Request message) to the UE in response to the first NR/5G SM message. The second NR/5G SM message includes the other flow ID. The NR/5G network includes the other flow ID in a second RRC Reconfiguration message transmitted to the UE. Thus, the UE knows that the NR/5G network configures a plurality of radio resources for communicating the data of the other data flow, when receiving the second RRC Reconfiguration message.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a method and a communication device for handling a PDN connection in LTE to NR/5G Inter-system Mobility. The PDN connection is mapped to a PDU Session, and a PDU Session ID of the PDU Session is associated to the PDN connection. Thus, the problem of Inter-system mobility between a LTE system and a NR/5G system is solved, and a UE moving between the two systems has seamless service continuity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A long-term evolution (LTE) network for handling mobility from the LTE network to a new radio (NR)/fifth generation (5G) network, comprising:
   a storage device memory; and
   a processing circuit, coupled to the storage device memory, wherein the storage device memory stores instructions, and the processing circuit is configured to execute the instructions of:
   activating a Packet Data Network (PDN) connection with a communication device;
   communicating a Protocol Data Unit (PDU) Session identity/identifier (ID) for the PDN connection with the communication device;
   communicating data via an evolved packet system (EPS) bearer associated to the PDN connection with the communication device;
   receiving a context request for the communication device from the NR/5G network; and
   transmitting a context response comprising a context of the communication device to the NR/5G network in response to the context request.

2. The LTE network of claim 1, wherein the NR/5G network transmits the context request to the LTE network, when receiving a NR/5G request message from the communication device.

3. The LTE network of claim 1, wherein the context comprises a PDU Session context, and the storage device memory further stores the instructions of:
   converting to the PDU Session context from an EPS bearer context; and
   transmitting the context response comprising the PDU Session context to the NR/5G network in response to the context request.

4. The LTE network of claim 1, wherein the context is an EPS bearer context comprising an EPS bearer identity.

5. The LTE network of claim 1, wherein the context comprises an EPS bearer context, and the NR/5G network converts to a PDU Session context from the EPS bearer context, configures a plurality of radio resources to the communication device according to the PDU Session context, and communicates data associated to the PDU Session ID via the plurality of radio resources with the communication device.

6. The LTE network of claim 1, wherein the context response comprises the PDU Session ID.

7. A long-term evolution (LTE) network for handling mobility from the LTE network to a new radio (NR)/fifth generation (5G) network, comprising:
  a storage device memory; and
  a processing circuit, coupled to the storage device memory, wherein the storage device memory stores instructions, and the processing circuit is configured to execute the instructions of:
  activating a Packet Data Network (PDN) connection with a communication device;
  communicating a Protocol Data Unit (PDU) Session identity/identifier (ID) for the PDN connection with the communication device;
  communicating data via an evolved packet system (EPS) bearer associated to the PDN connection with the communication device;
  transmitting a request message to the NR/5G network, to initiate a handover for the communication device to the NR/5G network, wherein the request message comprises a context of the communication device;
  receiving a response message from the NR/5G network, wherein the response message comprises a handover command message for handing over the communication device to the NR/5G network; and
  transmitting the handover command message to the communication device.

8. The LTE network of claim 7, wherein the context is an EPS bearer context and the storage device memory further stores the instructions of:
  converting to a PDU Session context from the EPS bearer context; and
  transmitting the request message comprising the PDU Session context to the NR/5G network.

9. The LTE network of claim 7, wherein the NR/5G network configures a radio bearer (RB) associated to the PDU Session ID to the communication device.

10. The LTE network of claim 7, wherein the communication device performs the handover to the NR/5G network in response to the handover command message received from the LTE network, and transmits a handover complete message to the NR/5G network when successfully connecting to the NR/5G network.

11. The LTE network of claim 10, wherein the NR/5G network transmits a notification message to the LTE network in response to a reception of the handover complete message.

12. The LTE network of claim 11, wherein the storage device further stores the instruction of:
  releasing at least one context of the communication device, when receiving the notification message.

13. A communication device for handling mobility from a long-term evolution (LTE) network to a new radio (NR)/fifth generation (5G) network, comprising:
  a storage device memory; and
  a processing circuit, coupled to the storage device memory, wherein the storage device memory stores instructions, and the processing circuit is configured to execute the instructions of:
  activating a first Packet Data Network (PDN) connection with the LTE network;
  communicating a first Protocol Data Unit (PDU) Session identity/identifier (ID) for the first PDN connection with the LTE network;
  communicating first data via an evolved packet system (EPS) bearer associated to the first PDN connection with the LTE network;
  receiving a handover command message from the LTE network, wherein the handover command message configures a first radio bearer (RB) which is associated to the first PDU Session ID;
  handing over from the LTE network to the NR/5G network according to the handover command message; and
  communicating second data of a first data flow on the first RB with the NR/5G network.

14. The communication device of claim 13, wherein the handover command message comprises a first RB configuration configuring the first RB, and comprises the first PDU Session ID.

15. The communication device of claim 13, wherein the handover command message comprises a flow ID for the first data flow associated to the first PDU Session ID, and associates the flow ID with the first RB.

16. The communication device of claim 13, wherein the handover command message configures a second RB which is not associated to the first PDU Session ID.

17. The communication device of claim 13, wherein the handover command message configures a second RB which is associated to a second PDU Session ID associated to a second PDN connection activated by the communication device with the LTE network.

18. The communication device of claim 17, wherein the storage device memory further stores the instruction of:
  communicating third data of a second data flow on the second RB with the NR/5G network.

* * * * *